United States Patent [19]

Ameau et al.

[11] 3,840,855

[45] Oct. 8, 1974

[54] AUTOMATIC SELECTOR FOR LINE CORRECTOR FOR DATA TRANSMISSION

[75] Inventors: Albert Ameau, Paris; Marcel-Louis Boyer, Chatillon; Francois Hebert, Palaiseau, all of France

[73] Assignee: Compagnie Industrielle Des Telecommunications Cit-Alcatel, Paris, France

[22] Filed: July 10, 1973

[21] Appl. No.: 378,022

[30] Foreign Application Priority Data

July 10, 1972 France ............................ 72.24914

[52] U.S. Cl. ............... 340/146.1 AX, 340/146.1 BE
[51] Int. Cl. ............................................ G06f 11/00
[58] Field of Search ......................... 325/41, 42, 56; 340/146.1 R, 146.1 AX, 146.1 BE

[56] References Cited

UNITED STATES PATENTS

| | | | |
|---|---|---|---|
| 3,078,443 | 2/1963 | Rose | 340/146.1 A X |
| 3,159,811 | 12/1964 | James et al. | 340/146.1 A X |
| 3,526,837 | 9/1970 | Zegers et al. | 340/146.1 BE |
| 3,654,603 | 4/1972 | Gunning et al. | 340/146.1 BE |
| 3,681,694 | 8/1972 | Sarati | 325/56 |
| 3,729,682 | 4/1973 | Elder | 325/56 |
| 3,735,266 | 5/1973 | Amitay | 325/56 |

*Primary Examiner*—Charles E. Atkinson
*Attorney, Agent, or Firm*—Craig & Antonelli

[57] ABSTRACT

An automatic selector for a data transmission line corrector selectively inserts a plurality of correctors in sequence in the line and measures the bipolarity errors associated with each corrector. The corrector which provides the least error is then connected to the line for purposes of that transmission.

6 Claims, 5 Drawing Figures

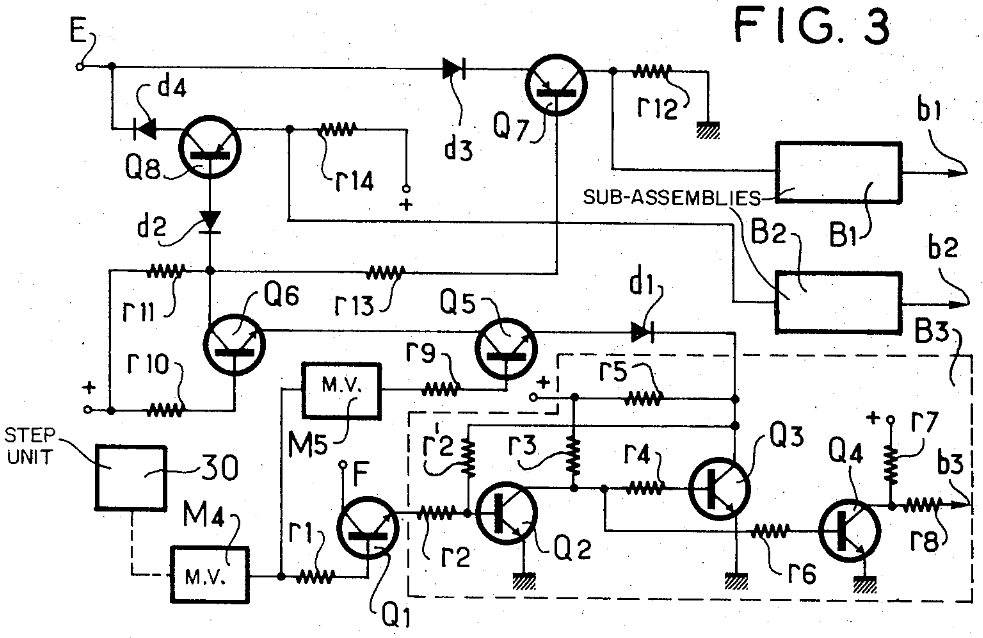
FIG. 3
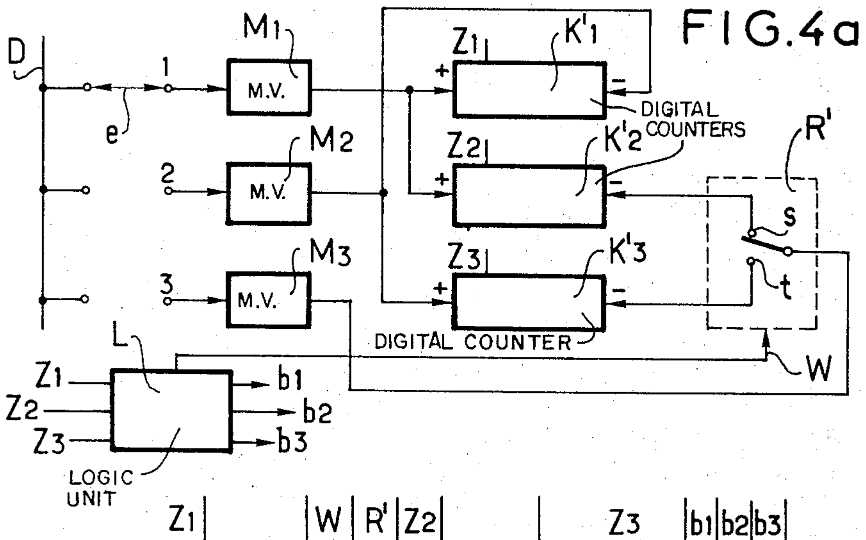
FIG. 4a
FIG. 4b
| $Z_1$ | | W | R' | $Z_2$ | | $Z_3$ | $b_1$ | $b_2$ | $b_3$ | |
|---|---|---|---|---|---|---|---|---|---|---|
| 1 | $N_1<N_2$ | 0 | s | 1 | $N_1<N_3$ | | 1 | 0 | 0 | $C_1$ |
| | | | | 0 | $N_3<N_1$ | | 0 | 0 | 1 | $C_3$ |
| 0 | $N_2<N_1$ | 1 | t | | | 1 $N_2<N_3$ | 0 | 1 | 0 | $C_2$ |
| | | | | | | 0 $N_3<N_2$ | 0 | 0 | 1 | $C_3$ |

AUTOMATIC SELECTOR FOR LINE CORRECTOR FOR DATA TRANSMISSION

The invention is concerned with the transmission of data by means of bipolar signals, and relates to an apparatus associated with a modem which is interconnected with a bipolarity error detector and automatically chooses, from a number of transmission line correctors, the one which supplies the smallest number of bipolarity errors in a given interval of time.

In data transmission, it is often preferred to use a bivalent signal (0, 1), which requires the transmission of a continuous component, rather than a bipolar signal having three levels (+1, 0, −1), which is not subject to this requirement. In the present case, it will be assumed that the type of signal employed is the interlaced bipolar signal of order 2, in which the spectral distribution of the energy is particularly advantagesous. It will be recalled that, in an interlaced bipolar code of order 2, the "0" bits are transmitted as "0s," the "1" bits occurring at the odd clock times are alternately rendered by $\epsilon 1, -\epsilon 1, \epsilon 1, -\epsilon 1$, etc., and the "1" bits occurring at the even clock times rendered by $\epsilon' 1, -\epsilon' 1, \epsilon' 1, -\epsilon' 1$, etc., $\epsilon$ and $\epsilon'$ being either − or +, but remaining unchanged throughout a transmission.

Assuming that the code is correct at transmission, it is not necessarily so at reception unless precautions are taken, because the transmission line generally exhibits appreciable distortions of amplitude and of group propagation time, and if the deformation of the signals received exceeds a certain limit, the signal received may sometimes not be absolutely bipolar. It is known to monitor the quality of the signal received by means of a bipolarity error detector.

It is also known to provide the modem with a line corrector for correcting distortions of the line, either in propagation time or in amplitude, or both. However, a single fixed corrector is generally not sufficient to correct adequately all the line configurations which may be encountered in working, even if all the lines conform to a given standard.

It is therefore advantageous to have available a number of correctors and, at the beginning of a data transmission, to devote a few seconds to the selection of the corrector which supplies a signal of the best possible quality, that is to say, which gives the smallest number of bipolarity errors out of all the available correctors.

The invention resides essentially in a logic system which, in association with a switching device which can successively insert a number of line correctors into the modem at the reception end, fixedly retains the corrector which produces the minimum number of bipolarity errors. The various correctors are successively inserted in the modem for equal times. The logic system compares the number of bipolarity errors given by the various correctors, and fixedly connects that one which gives the smallest number thereof.

In order to show any faults in the transmission line, it is advantageous to bring out the random variations of the decoding by systematically introducing a certain noise into the modem. The invention provides a particularly advantageous means of introducing this additional noise.

The invention will be described in detail with reference to a possible embodiment which is illustrated in the accompanying figures, in which:

FIG. 3 is a schematic circuit diagram of a subassembly contained in FIG. 2;

Figure 2:
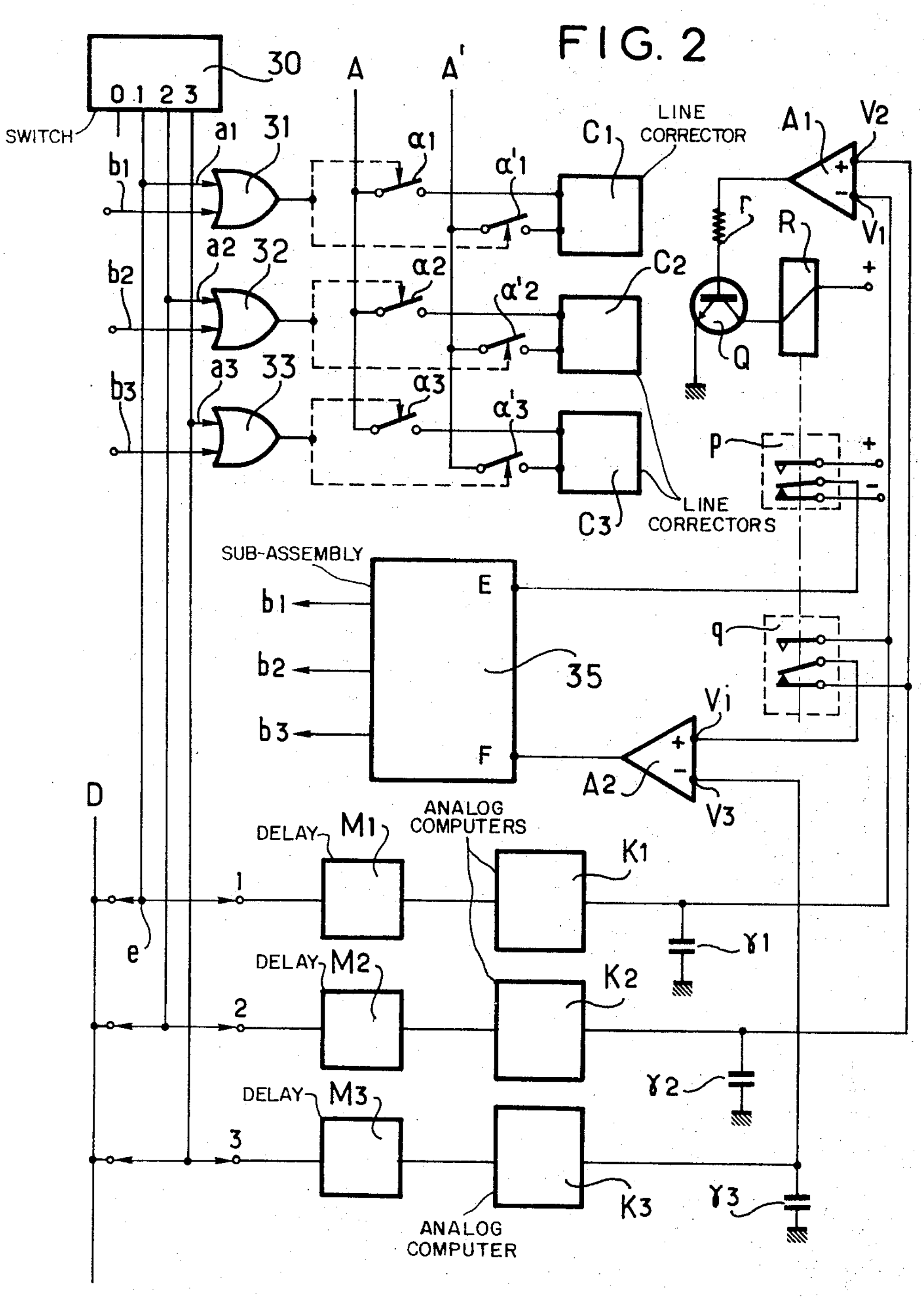
FIG. 2 is a schematic circuit diagram of a logic system contained in the diagram according to FIG. 1.

FIG. **4*a* is a schematic block diagram of a variant of the arrangement illustrated in FIG. 2; and FIG. 4*b* is a table indicating the various cases of operation of a logic system illustrated in the diagram of FIG. 4*a***.

Figure 1:
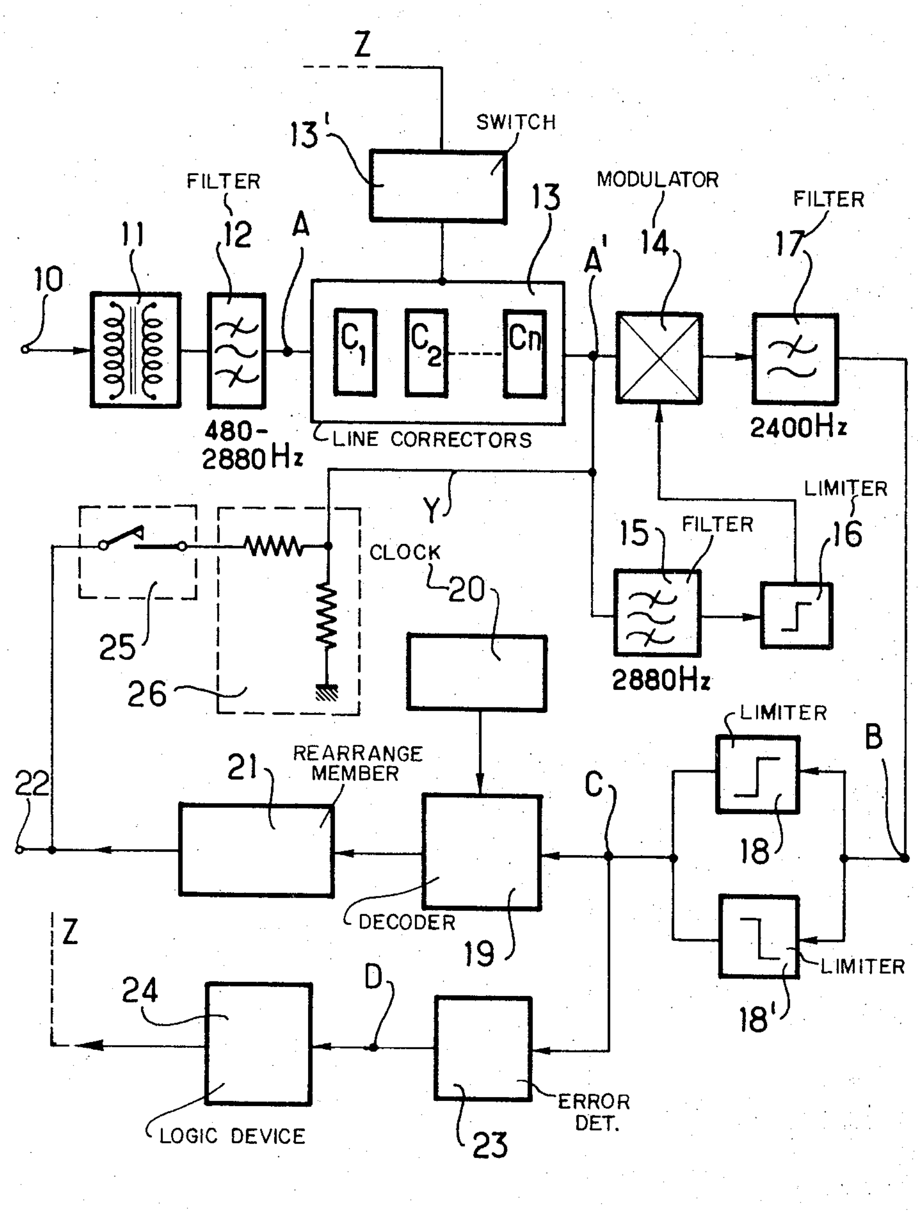
FIG. 1 is a schematic diagram of the receiving part of a modem equipped in accordance with the invention.

FIG. 1 is a simplified diagram of the receiving part of a modem, showing only the members involved in the present invention. A line for the transmission of data arriving at an input 10 passes through an input transformer 11 and then a band-pass filter 12 having a band of 480 – 2880 Hz. This filter is compensated in group propagation time by a corrector (not shown). There then follows a line corrector C1 or C2, . . . or **C*n*, chosen from n correctors forming an assembly 13 having an input A and an output A', by a switch 13'**, under the control Z of a logic device 24

A base band transposition is thereafter effected by a modulator 14 which receives a 2880 Hz carrier, extracted from the signal received at the output of 13 by a narrow-band filter 15 followed by a peak limiter 16. The modulator 14 is followed by a low-pass filter 17, which cuts off at 2400 Hz, and which is also compensated in respect of group propagation time. There is present at the output of the filter 17, at B, a three-level base band signal.

This signal is received at two peak limiters 18 and 18' of opposite polarities, which are so arranged as to supply at the point C a bivalent signal having two levels (0, 1). This signal is decoded by a decoder 19 controlled by a clock 20, which is slaved, by known means, to the most favorable phase for the decoding.

The decoded bivalent signals are returned into order by a rearrangement member 21, which has the effect of suppressing systematic interference introduced at the transmission (known as "scrambling"). The scrambler is introduced into the transmission part of the modem (not shown) in order to avoid prolongation of a series of zeros which might occur in the data signal to be transmitted. The signal which has been scrambled in accordance with a predetermined law is rearranged at reception in accordance with an inverse process by the action of the rearrangement member 21. The restored signal leaves at 22.

Branched from the point C is a bipolarity error detector 23. Such a member supplies an output pulse at the point D at each bipolarity error. These pulses are received and utilized by a logic device 24, which is connected to the switch 13' by a line Z.

The manner of operation of the switch 13' will be explained in detail with reference to FIG. 2.

At the beginning of a transmission, the switch 13' successively renders operative the correctors C1, C2, . . . **C*n* for equal periods of time T. During each interval T, the bipolarity errors detected by the detector 23,** which are N1, N2, . . . N*n* in number, are separately stored in the logic device 24. When the switch 13' has passed through its n positions, the logic device 24 has stored therein the n numbers of bipolarity errors corresponding to each of the n correctors **C1, C2, . . . C*n*. Of these n numbers, it determines the smallest (which generally exists) Nj, and by way of the line Z it brings the switch 13'** to the position j. The modem is therefore now fixedly equipped (until the end of the transmission) with the most favorable possible line corrector.

As has been stated in the foregoing, it is advantageous to introduce into the signal received a low noise level which has the effect of lowering the quality of the signal and of bringing out the defects in bipolarity. Within the scope of the present invention, the use of a separate noise generator is avoided by reinjecting at the point A' through a line Y a portion of the signal leaving at 22 the rearrangement member 21, because there is no morphological correlation between the signal at A and the signal at 22. The output signal at 22 therefore has, with respect to the signal at A, a random character and thus serves as noise.

The signal at 22 is introduced through an off-normal contact 25 which is closed throughout the test, through an attenuator 26.

FIG. 2 is a diagram of the logic device 24 in the case where the counting of the bipolarity errors takes place in analog form.

The number of correctors is fixed to three, C1, C2, C3, to which there correspond respectively three analog counters K1, K2, K3. A step-by-step switch 30 having four positions 0, 1, 2, 3, controls two groups of members:

1. Three pairs of off-normal contacts $\alpha_1$, $\alpha'_1$, $\alpha_2$, $\alpha'_2$, $\alpha_3$, $\alpha'_3$ through three OR circuits 31, 32, 33, respectively. The positions 1, 2, 3 are connected respectively to the inputs $a_1$, $a_2$, $a_3$ of the three OR circuits 31, 32, 33. The position 1 closes the contact $\alpha_1$, which connects the input of C1 to A (FIG. 1) and the contact $\alpha'_1$ which connects the output of C1 to A' (FIG. 1), and so on for the positions 2 and 3, the indices 2 and 3 respectively being used to denote the off-normal contacts.
2. Three analog computers K1, K2, K3, preceded by three delay circuits $\tau$ ($M_1$, $M_2$, $M_3$ respectively) terminating at three capacitors ($\gamma_1$, $\gamma_2$, $\gamma_3$). A slider e connects the terminal D (FIG. 1) to the circuit $M_1$ at the position 1, to the circuit $M_2$ at the position 2 and to the circuit $M_3$ at the position 3.

The effect of the delay circuits $M_1$, $M_2$, $M_3$, all of which give equal delays $\gamma$, is to wait until the circuits have reached their stabilization after each switching. If the slider *e* stops at each position for five seconds, there will be taken, for example, for the three circuits $M_1$, $M_2$, $M_3$ a delay $\tau$ equal to two seconds, leaving three seconds for the counting of the bipolarity errors at each position.

At the end of an exploration, of a total duration of fifteen seconds, for example, the voltages at the capacitors $\gamma_1$, $\gamma_2$, $\gamma_3$ are equal to V1, V2, V3, respectively.

The voltages V1 and V2 are applied to the two inputs of a comparator-amplifier A1, for example V1 to the terminal −, V2 to the terminal +. The output of the amplifier A1 is connected to the base of an NPN transistor Q through a resistor *r*. In the collector circuit of the transistor Q there is provided a relay R having two reversing contacts p and q. With V2> V1, the relay R is operative, while if this condition is not satisfied it is inoperative. The emitter is earthed.

The reversing contact *p* is connected to a source + (operative) or to a source − (inoperative). The reversing contact *q* is connected to V1 (operative) or V2 (inoperative).

A second comparator-amplifier A2 has its positive input connected to the common of *q* (voltage Vi = either V1 or V2) and its negative input connected to $\gamma_3$.

A subassembly 35 receives at one input E the common of the reversing contact *p*, and at an input F the output of the amplifier A2. It gives at its output three signals, namely *b*1 which is received by the OR circuit 31, b2 which is received by the OR circuit 32, and b3 which is received by the OR circuit 33.

The following truth table can be established:

| | R | E | Vi | | F | Minimum |
|---|---|---|---|---|---|---|
| V2 > V1 | on | + | V1 | V3 < V1 | + | V3 |
| | on | + | V1 | V3 > V1 | − | V1 |
| V2 < V1 | off | − | V2 | V3 < V2 | + | V3 |
| | off − | − | V2 | V3 > V2 | − | V2 |

or again:

| F | E | Minimum |
|---|---|---|
| + | either | V3 |
| | + | V1 |
| − | | |
| | − | V2 |

FIG. 2 must be regarded as a symbolic diagram. The relay R is preferably an electromechanical relay as drawn, but the remainder of the technology involves transistors and diodes. More particularly, there will be utilized for the step-by-step operation the states of an electronic counter, and for the switches diode switches.

FIG. 3 is a simplified diagram of the subassembly 35 of FIG. 2. It comprises in the lower part a NPN transistor Q1 whose collector is connected to the terminal F (see FIG. 2), whose base can receive, through a resistor r1, a positive pulse supplied by a monostable multivibrator M4, of a duration $\tau$4, which is operated by the recurrence of the state 3 of the step-by-step unit 30 (FIG. 2).

The transistor Q1 has its emitter connected by a resistor *r*2 to the base of a NPN transistor Q2 whose collector is supplied by a positive source through a resistor *r*3. The base of Q2 is also connected by a resistor *r'*2 to the collector of Q3.

The collector of Q2 is connected by r4 to the base of a NPN transistor Q3 supplied by a positive source through r5, and is also connected through *r*6 to the base of a NPN transistor Q4 whose collector is supplied by a positive source through *r*7. Beyond a resistor *r*8, there is extracted from the collector Q4 the signal *b*3 (FIG. 2). The transistors Q2, Q3, Q4 contained in a chain-lined border $B_3$ constitute a bistable multivibrator which is self-holding when Q4 is in the nonconducting state.

A NPN transistor Q5, which receives a turn-on pulse from its base through *r*9, from a monostable multivibrator M5, which is operated by the return of M4, has its emitter connected to the collector of Q3 through a diode *d*1. Its collector is connected to the emitter of a NPN transistor Q6, the base of which is supplied from a positive source through a resistor *r*10 and the collector through a resistor r11.

A diode d3 conducting in the direction from left to right is connected between the point E (FIG. 2) and the emitter of a PNP transistor Q7 whose collector is connected to earth through *r*12 and whose base is connected to the collector of Q6 through *r*13.

A diode d4 conducting in the direction from right to left is connected between the point E and the collector of a PNP transistor Q8, whose emitter is supplied by a positive source through a resistor r14, and whose base is connected to the collector of Q6 by a diode *d*2.

The subassemblies B1 and B2 are of the same construction as the subassembly B3 (self-holding multivibrators).

The subassembly B1 has its input connected to the collector of Q7 and can supply at its output the signal b1 (FIG. 2).

The subassembly B2 has its input connected to the emitter of Q8 and can supply at its output the signal b2 (FIG. 2).

OPERATION — On referring simultaneously to FIGS. 2 and 3, the following results will readily be verified:

1. V3 < V1 and V2

When the monostable multivibrator M4 is set, the point F is positive and Q1 is conductive, whereby Q2 is saturated and Q3 and Q4 are rendered nonconductive. Due to the fact that Q3 is nonconductive, the potential of its collector rises, which confirms the situation of Q2 through the resistor R'2 (self-holding). Q4 supplies at its output a logic signal *b*3, which is a 1: the corrector C3 is fixedly operated. The emitter of Q5 being at the potential of the collector of Q5, through d1, Q5 and Q6 are nonconductive. This means at the same time that C3 is operated, and permanent operation of C1 and C2 is prevented.

2. V1 < V2 and V3

The output of A1 is at 1, and the relay R pulls up. The output of A2 is at 0. Q1 remains nonconducting, and Q3 and Q4 are saturated. The pulse leaving M5 renders conductive Q5 and therefore Q6. Consequently, Q7 becomes conductive (point E positive, normally closed contact *p*), and hence a signal *b*1 = 1 is set up at the output of B1: the corrector C1 is set in continuous operation, to the exclusion of C2 and C3.

3. V2 < V1 and V3.

The output of A1 is at 0, and the relay R does not pull up. The output of A2 is at 0. Q1 remains nonconductive. The monostable multivibrator MF renders conductive Q5 and Q6, which results in the conduction of Q8, which is supplied by the negative point E (normally closed contact p). Hence, a signal *b*2 = 1 is set up at the output of B2: the corrector C2 is rendered continuously operative to the exclusion of C1 and C3.

BIPOLARITY ERROR DETECTOR — The principle of the construction of a member well known in the art will be recalled, without any detailed description:

It comprises a pair of multivibrators of the "master-slave" JK type, interconnected in pairs, and associated logic circuits, as well as a D-type multivibrator acted on by the clock, which supplies a secondary half-frequency clock. One pair of JK multivibrators is acted on by the output pulses of a peak limiter of one polarity, such as 18 (FIG. 1), and the other by the output of a peak limiter of the other polarity, such as 18' (FIG. 1). One pair of multivibrators is controlled by the secondary clock and the other by its complement.

The output of the bipolarity error detector (not shown) comprises a four-input AND gate. Normally, the four inputs of the said AND gate are at 1, and the AND gate gives a zero at its output. If one of the four inputs is at 0 (bipolarity error), the AND gate gives a 1 at its output.

FIG. 4*a* is a simplified symbolic diagram of one version of the apparatus utilizing a logic counting unit.

In this case, the installation comprises three digital counters K'1, K'2, K'3, each having one forward counting input marked (+) and one backward counting input marked (−).

The slider e connects the point D to one of the three positions 1, 2, 3 (see FIG. 2).

At the position 1, the connection is made through M1 to the input (+) of K'1 and the input (+) of K'2.

At the position 2, the connection is made through M2 to the input (−) of K 1 and the input (+) of K'3.

At the position 3, the connection is made through M3 either to a normally closed contact of a relay R' or to a contact t of this relay, under a control W. s is connected to the input (−) of K'2, and *t* is connected to the input (−) of K'3.

It will be assumed that N1, N2 and N3 are the numbers of bipolarity errors at the three positions 1, 2 and 3 respectively. If any one of the three counters, which has received a forward counting charge in a first phase, thereafter receives a higher backward counting charge, it passes through zero; if the backward counting charge received is lower, the counter concerned does not pass through zero. The passage through zero of the counters K'1, K'2 and K'3 sets up logic signals Z1, Z2 and Z3, respectively.

These three signals are received at a logic unit L, which can supply an instruction W for the energization of the relay R', and at the end of the testing cycle three signals *b*1, *b*2 and *b*3, identical to the signals of like name which appear in FIG. 2, and have the same effect.

FIG. 4*b* is a table indicating the conditions produced by the logic unit L.

It will be recalled that in this table Z1 = 1 indicates the passage through zero of the counter K'1, etc.; Z1 = 0 indicates that the counter K'1 has not passed through zero.

To sum up, with Z1 = 1, Z2 = 1, the corrector chosen is C1.

With Z2 = 1, Z2 = 0, the corrector chosen is C3.

With Z1 = 0, Z3 = 1, the corrector chosen is C2.

With Z1 = 0, Z3 = 0, the corrector chosen is C3.

What is claimed is:

1. Automatic selector for a data transmission line corrector operating in accordance with a bipolar coding, for example an interlaced bipolar coding of order 2, which effects the selection, from n correctors, of that one which supplies a minimum number of bipolarity errors, comprising exploration switching means for successively connecting said n correctors to said data transmission line, and detector means for detecting bipolarity errors in the signal received at the output of each corrector, including means for the storage and comparison of the numbers of bipolarity errors detected at the output of each of said correctors at the n exploration positions, logic means for detecting the minimum number of bipolarity errors and means responsive to said logic means for fixedly setting in operation the corrector providing said minimum number of bipolarity errors.

2. Automatic selector according to claim 1, characterized in that the pulses supplied by the bipolarity error detector means in each of the *n* positions are registered by analog means comprising essentially a capacitor which stores a charge proportional to the number of pulses received, the voltages thus obtained being applied to the input of said logic means.

3. Automatic selector according to claim 2, in which there is provided three correctors, and further including two comparator-amplifiers selectively connected to said capacitors to compare the voltages at the three capacitors.

4. Automatic selector according to claim 1, wherein said logic means includes a plurality of digital pulse counters of the backward and forward counting type for comparing the numbers of bipolarity errors.

5. Automatic selector according to claim 4, characterized in that there is provided three forward and backward counters connected to the output of respective correctors.

6. Automatic selector according to claim 1, including rearranging means connected to the outputs of said correctors to effect scrambling of the transmission and a means for effecting an inverse rearrangement of the output of said rearranging means to introduce a low noise level into the signal to be checked and extracted from the output of the said rearranging member.

* * * * *